(12) United States Patent
Grimsley (10) Patent No.: US 10,411,642 B2
(45) Date of Patent: Sep. 10, 2019

(54) SOLAR ASSEMBLY AND METHOD OF FORMING SAME

(71) Applicant: James L. Grimsley, Norman, OK (US)

(72) Inventor: James L. Grimsley, Norman, OK (US)

(73) Assignee: James L. Grimsley, Norman, OK (US)

( * ) Notice: Subject to any disclaimer, the term of this patent is extended or adjusted under 35 U.S.C. 154(b) by 238 days.

(21) Appl. No.: 15/422,581

(22) Filed: Feb. 2, 2017

(65) Prior Publication Data

US 2018/0013378 A1 Jan. 11, 2018

Related U.S. Application Data

(63) Continuation of application No. 13/551,799, filed on Jul. 18, 2012, now Pat. No. 9,595,910.

(60) Provisional application No. 61/508,841, filed on Jul. 18, 2011.

(51) Int. Cl.
| | |
|---|---|
| *H02N 6/00* | (2006.01) |
| *H01L 31/042* | (2014.01) |
| *H02S 20/00* | (2014.01) |
| *B64C 3/00* | (2006.01) |
| *F24S 25/00* | (2018.01) |
| *F24S 25/11* | (2018.01) |
| *F24S 30/42* | (2018.01) |
| *H02S 20/32* | (2014.01) |
| *H02S 20/30* | (2014.01) |
| *H02S 40/22* | (2014.01) |

(Continued)

(52) U.S. Cl.
CPC ............... *H02S 20/00* (2013.01); *B64C 3/00* (2013.01); *F24S 25/00* (2018.05); *F24S 25/11* (2018.05); *F24S 30/42* (2018.05); *H02S 20/22* (2014.12); *H02S 20/23* (2014.12); *H02S 20/30* (2014.12); *H02S 20/32* (2014.12); *H02S 40/22* (2014.12); *B64D 2211/00* (2013.01); *Y02B 10/12* (2013.01); *Y02E 10/47* (2013.01); *Y02E 10/52* (2013.01); *Y02T 50/55* (2018.05)

(58) Field of Classification Search
CPC ............................ B64D 2211/00; F24S 30/42
See application file for complete search history.

(56) References Cited

U.S. PATENT DOCUMENTS

| | | | | |
|---|---|---|---|---|
| 3,690,080 A | * | 9/1972 | Dillard | B64G 1/222 |
| | | | | 136/245 |
| 5,131,955 A | * | 7/1992 | Stern | B64G 1/443 |
| | | | | 136/245 |

(Continued)

*Primary Examiner* — Angelo Trivisonno
(74) *Attorney, Agent, or Firm* — Holland & Hart LLP (57) ABSTRACT

Various aspects provide for a solar assembly. The solar assembly may be a mechanical structure that allows many small solar cells to be integrated into the wing design of an aircraft without placing them on the surface area of the wing or the vehicle. Additional aspects may provide for an adjustable solar assembly. The adjustable solar assembly may be configured to be installed into a structure having a structural profile. When installed, the solar assembly may conform to the structural profile such that the structural profile is maintained. The solar assembly may further comprise an adjustable carrier system comprising a plurality of solar cells attached thereto. The adjustable carrier system may be configured to dynamically adjust the orientation of the solar cells so as to maintain an optimal angle with respect to an external light source.

11 Claims, 9 Drawing Sheets

(51) Int. Cl.
*H02S 20/23* (2014.01)
*H02S 20/22* (2014.01)

(56) References Cited

U.S. PATENT DOCUMENTS 6,607,163 B2 * 8/2003 Perry .................. B64B 1/06
  244/24
7,270,295 B2 * 9/2007 Bennett ................ B64D 27/24
  244/59

* cited by examiner

SOLAR ASSEMBLY AND METHOD OF FORMING SAME

CROSS-REFERENCE TO RELATED APPLICATIONS

This application is a continuation of U.S. patent application Ser. No. 13/551,799, filed Jul. 18, 2012, entitled, "Solar Assembly and Method of Forming Same," which claims priority to U.S. Provisional Application No. 61/508,841, filed Jul. 18, 2011, entitled "Solar Assembly and Method of Forming Same," each of which are incorporated by reference in their entirety for all purposes.

STATEMENT REGARDING FEDERALLY SPONSORED RESEARCH OR DEVELOPMENT

This invention was made with government support under contract number FA8651-09-M-0109 awarded by the Department of Defense. The government has certain rights in the invention.

BACKGROUND

1. Technical Field

The present disclosure generally relates to a solar assembly and method of forming same. More particularly, but not by way of limitation, the present disclosure relates to a solar assembly configured to be integrated into a structure having a geometric profile wherein integration of the solar assembly preserves the integrity of the geometric profile of the structure.

2. Description of Related Art

A solar cell is generally understood to be a device that collects and converts irradiated light energy into an electrical current. A plurality of solar cells may be connected in series and/or in parallel to thereby form a solar array. Such solar arrays may be connected to control circuitry and/or logic configured to receive and/or condition the voltage provided by the solar cells and then provide the voltage to, for example, a battery for storage, a power supply for regulation/control, and/or to a system as an operating voltage. Generally, maximization of the surface area of the solar cells facing the irradiated light (e.g., sunlight) results in increased efficiency and output of the solar module, i.e., power point tracking.

One or more solar modules may be included in a solar assembly configured to be mounted to a stationary structure/object, e.g., a roof top, the side of a building, etc. The one or more solar modules may also be included in a solar assembly configured to be mounted on a non-stationary object, e.g., an automobile, a boat, a helicopter, an airplane, etc. Mounting the solar assembly on a non-stationary object gives rise to a number of issues. For instance, issues arise regarding the orientation of the solar cells with respect to the irradiated light source, e.g., sunlight. That is, maximization of the collection of irradiated light through power point tracking may become more difficult as the movable object moves and/or otherwise changes orientation with respect to the light source.

Another issue that may arise when including a solar assembly on a movable object may be the impact of the solar assembly structure with respect to the geometric profile of the object. For example, advancements in a variety of areas have enabled the use of solar power for a variety of aircraft purposes including powering of the electric propulsion and power-train for small air vehicles. There is a need to place solar cells on or within these vehicles in such a way that the aerodynamic properties of the vehicle design are not disturbed or adversely impacted. Current designs for integrating solar/photovoltaic cells and arrays into air vehicle designs requires that the solar cells be mounted on the external surfaces of the wings. Since most solar cell technologies utilize very thin and fragile crystalline structures, it is difficult and mostly impossible to apply flat solar cell designs to curved airfoils and aerodynamic structures. The alternative is to sacrifice aerodynamic performance by altering the airfoil design or only using solar cells on those portions of the external wing surface that are flat. The present disclosure described herein alleviates both problems and enables integrating solar/photovoltaic cell arrays without impacting or sacrificing aerodynamic design or performance.

SUMMARY OF THE INVENTION

Various aspects provide for a solar assembly having geometric properties. In one aspect, the solar assembly may be a mechanical structure that allows many small solar cells to be integrated into the wing design of an aircraft without placing them on the surface area of the wing or the vehicle. The solar assembly design allows the maximum use of the internal wing volume to collect irradiated light from an external source (i.e.—solar/sun, indoor artificial lighting, etc.) for use in photovoltaic energy conversion.

Various aspects may provide for a mechanical design that allows multiple solar cells (i.e.—an array of photovoltaic cells) to be arranged in such a way as to maximize exposure to externally-generated irradiated light energy. The inside of the solar assembly may be coated with a reflective coating to maximize the capture and conversion of light energy into electrical energy. A transparent (clear) skin or film is applied to the top of a solar assembly aperture to create a smooth aerodynamic surface that matches the airfoil properties of the wing.

Various aspects may provide for a solar assembly comprising a first carrier and a second carrier adapted to be mounted in a structure having a structural profile. The first and second carriers may have a top profile substantially corresponding to the structural profile. A plurality of corresponding slots on each of the first and second carriers may be configured to receive a plurality of solar cells such that the solar cells extend between the first and second carriers and are oriented in a predetermined geometric plan with respect to each other.

Various aspects may also provide for an adjustable solar assembly. The adjustable solar assembly may comprise a solar assembly configured to be installed into a structure having a structural profile wherein, when the solar assembly is installed, the structural profile is maintained. The solar assembly may comprise a slotted carrier system having a plurality of solar cells attached thereto, the slotted carrier system configured to expand to orient the solar cells at a first angle and to contract to orient the solar cells at a second angle.

Additional aspects may provide for an adjustable solar assembly. The adjustable solar assembly may be configured to be installed into a structure having a structural profile. When installed, the solar assembly may conform to the structural profile such that the structural profile is maintained. The solar assembly may further comprise an adjustable carrier system comprising a plurality of solar cells attached thereto. The adjustable carrier system may be configured to dynamically adjust the orientation of the solar cells so as to maintain an optimal angle with respect to an external light source.

Various aspects may further provide for a method for installing a solar assembly in a structure having an aerodynamic profile. The method may comprise installing a solar assembly having a plurality of solar cells therein into a structure having an aerodynamic profile wherein, when installed, the aerodynamic profile is maintained.

DETAILED DESCRIPTION OF THE INVENTION

Before explaining the presently disclosed and claimed inventive concept(s) in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

Generally, the presently claimed and disclosed inventive concept(s) relate to a solar assembly adapted to be used in a structure having a geometric or structural profile, wherein the profile of the structure is maintained when the solar assembly is installed therein. A variety of structure designs include structural profiles or shapes which are integral to the operation/function of the structure. Examples of such structures and their associated structural profiles include, but are not limited to, the aerodynamic profiles of an airplane wing, the fuselage of a rotary wing aircraft, an automobile body, etc. Other structures include structural profiles or shapes which serve other purposes such as space limitations (i.e., permit the structure to fit within a predetermined space) and/or aesthetics. Any or all of such structures may benefit from the inclusion of solar energy provided by the presently claimed and disclosed inventive concept(s). That is, it is to be understood that the presently claimed and disclosed inventive concept(s) may be adapted to any such structure wherein utilization of solar energy is desired while the geometric or structural profile of the structure is to be maintained.

In one example, the solar assembly described herein may be installed in the wing of an aircraft such that the aerodynamic properties of the wing are maintained. An aircraft wing is designed to have an aerodynamic profile that minimizes drag while providing lift to the aircraft. Generally, the structure of the wing includes a plurality of spars extending laterally from the aircraft fuselage and a plurality of ribs extending between the spars. The spar/rib structure may then covered with a skin. In this example, the solar assembly may be mounted between the ribs and/or spars of the wing and include a transparent skin or cover over a top aperture which permits the external irradiated light to enter the solar assembly to thereby be collected and converted to electrical energy for use by the airplane. The transparent skin or cover may maximize the capture of light through the top aperture in the top of the solar assembly. In this example, the solar assembly may also be referred to as a solar wing box.

Generally, the solar assembly may include a plurality of solar cells which collect external irradiated light and convert the light to electrical energy. The solar cells may be mounted in a fixed orientation with respect to each other. Alternatively, disclosed is an adjustable solar assembly wherein the orientation or angle between the solar cells may be adjusted dynamically to ensure maximum power point tracking, manually during or prior to deployment, or periodically. The solar assembly may include a reflective coating or material on the interior surfaces, e.g., those surfaces of the solar assembly other than the solar cells. The reflective coating or material may ensure ambient or reflected light can be redirected to the solar cells for capture.

The solar assembly may utilize an arrangement of "slots" to hold individual solar cells that are each oriented in a geometric plan in such a way as to ensure that the effective surface area of the solar cells is maximized. The width and angle of the individual slots can be adjusted (either during manufacture, during installation, dynamically while in use, etc.) based on the number of individual solar cells used or the necessary orientation angles required for maximum physical power point tracking. The outer geometric envelope of the solar assembly may be designed to fit within the various aerodynamic airfoil cross-section shapes so that the solar assembly may be integrated into a variety of aircraft designs. The inside surfaces of the solar assembly may be coated with a reflective coating that maximizes the capture of reflected light that is captured within the top aperture of the solar assembly. A transparent film or "skin" is placed on top of the solar assembly aperture to enable a smooth aerodynamic surface for the wing as well as to enable the capture of irradiated light energy from external sources. The solar assembly may include one or more slots or openings configured to release heat from within the solar assembly, e.g., slots in opposite ends of the solar assembly permitting air to flow over the solar cells.

Generally, the solar assembly may consist of an arrangement of "slotted" carriers that each hold an individual solar cell. The overall solar assembly may be fabricated and/or constructed as a single monolithic mechanical structure. The overall shape and design of the solar assembly allows for integration into a variety of aerodynamic airfoils that are used in aircraft and other wings of air vehicles. Multiple solar assemblies may be fabricated and placed in an aircraft wing structure. By using multiple solar assemblies, it is possible to accommodate a variety of wing geometries including morphing wing designs. The solar assembly design may also be utilized in biomimetic wing designs.

Further, the mechanical design allows multiple solar cells (i.e.—an array of photovoltaic cells) to be arranged in such a way as to maximize exposure to externally-generated irradiated light energy. The inside of the solar assembly may be coated with a reflective coating to maximize the capture and conversion of light energy into electrical energy. A transparent (clear) coating or film is applied to the top of the solar assembly aperture to create a smooth aerodynamic surface that matches the airfoil properties of the wing.

Figure 1:
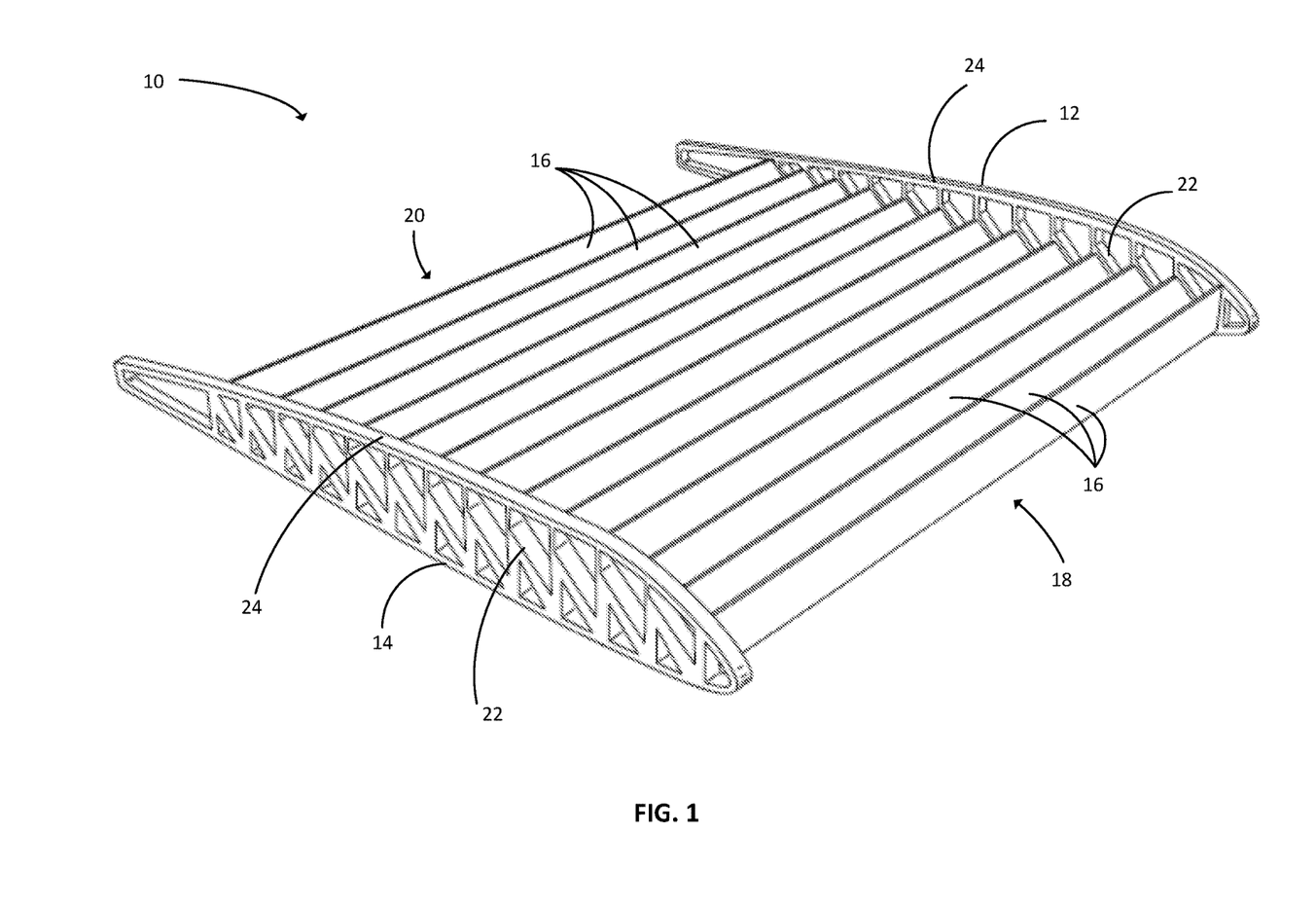
FIG. 1 is a perspective view of an exemplary solar assembly constructed in accordance with the present disclosure.

Turning now to FIG. 1, shown therein and designated by reference numeral 10 is an exemplary solar assembly constructed in accordance with the present disclosure. In the example shown in FIG. 1, the solar assembly 10 is designed to have an aerodynamic profile so as to be included in the wing of an aircraft. The solar assembly 10 includes a first carrier 12 and a second carrier 14 and a plurality of solar cells 16 extending between the first and second carriers 12 and 14. The first and second carriers 12 and 14 are adapted to be mounted or otherwise installed into a structure having a structural profile (e.g., an aircraft wing having an aerodynamic profile). The solar assembly 10 may further include a first end 18 (also referred to as a forward end, front end, etc.) and a second end 20 (also referred to as an aft end, back end, etc.). In the example shown in FIG. 1, the first end 18 would correspond to the forward or leading edge of the aircraft wing.

As shown in FIG. 1, when mounted in the structure, the first and second carriers 12 and 14 are generally opposed to each other. The first and second carriers 12 and 14 may be mounted or otherwise installed in the structure by, for example, bolts, rivets, welding, etc. The first and second carriers 12 and 14 may be constructed of a variety of materials such as, aircraft quality steel or aluminum, a composite material (e.g., fiber composite), etc.

The solar assembly 10 further may include a plurality of corresponding slots 22 on each of the first and second carriers 12 and 14. The slots 22 are configured or otherwise adapted to receive the solar cells 16. When installed or otherwise mounted in the slots 22, the solar cells 16 extend between the first and second carriers 12 and 14. The solar cells 16 may be mounted or otherwise installed on the slots 22 by, for example, adhesive, compression fitting, clips, etc.

Figure 2:
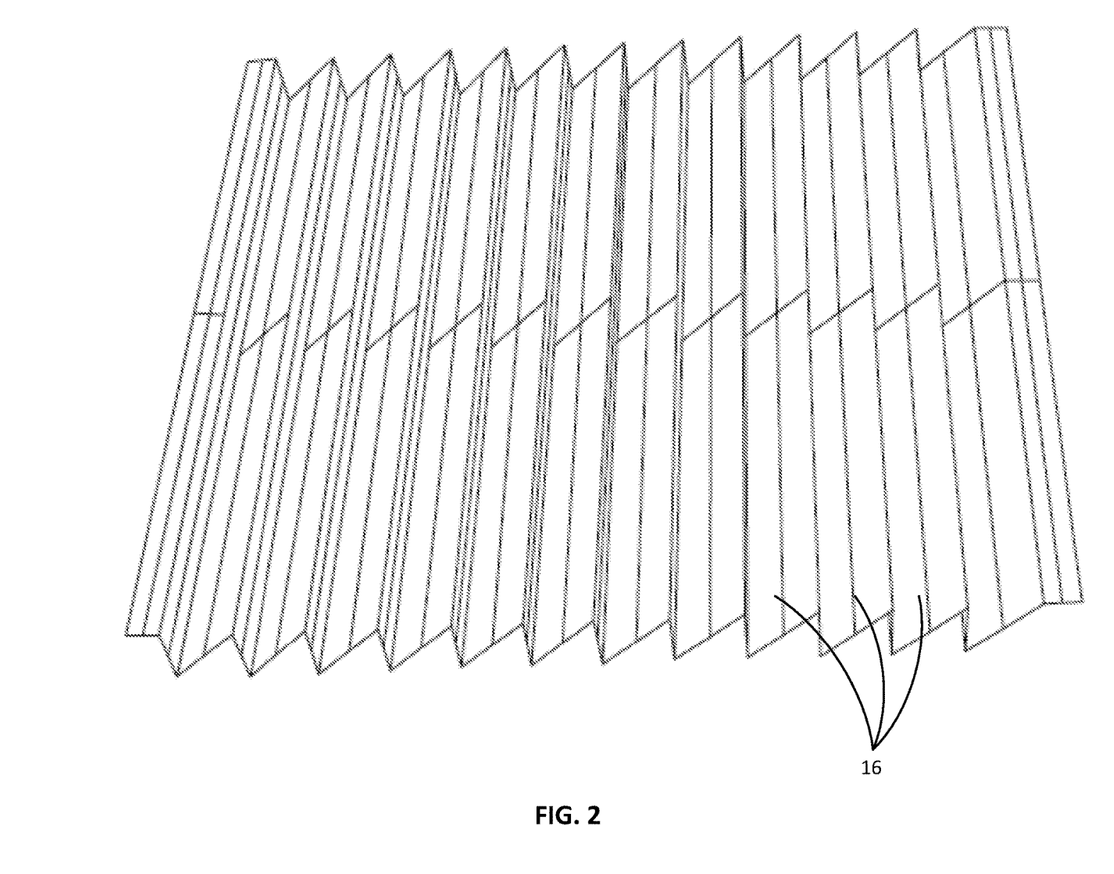
FIG. 2 is a perspective view illustrating an exemplary geometric plan for the solar cells using the solar assembly of the present disclosure.

The slots 22 may be configured or otherwise adapted such that the solar cells 16, when mounted thereon, may be oriented at a predetermined angle, orientation, or geometric plan with respect to each other in order to increase or maximize exposure to external irradiated light, i.e., to increase power point tracking. One exemplary orientation or geometric pattern for the solar cells 16 is illustrated in FIG. 2. In the example shown in FIG. 2, the solar cells 16 are oriented in a sawtooth pattern/orientation. However, it is to be understood that the solar cells 16 may be oriented or otherwise positioned at a variety of angles/orientation schemes or geometric plans with respect to each other.

Referring again to FIG. 1, the first and second carriers 12 and 14 may include a top profile 24 extending between the first and second ends 18 and 20. The top profile 24 may substantially correspond to the profile of the structure the solar assembly 10 is to be mounted in. That is, the top profile 24 may be curved, tapered, or otherwise shaped so as to align with the structural profile in order to maintain the integrity of the structural profile. In the example shown in FIG. 1, the top profile 24 corresponds to the aerodynamic profile of the aircraft wing such that when the solar assembly 10 is mounted therein, the function of the wing is maintained. The space between the top profiles 24 for the first and second carriers 12 and 14 may generally define a top aperture of the solar assembly 10. The top aperture would generally be understood to be the opening at the top of the solar assembly 10 wherein the external light enters the assembly 10 and is received by the solar cells 16.

Other aspects may provide for a transparent cover or skin to be placed on the top aperture of the solar assembly 10 in such a manner as to maintain a smooth and contiguous surface on the structure the assembly 10 is to be installed into. In the example shown in FIG. 1, the skin would be mounted on top of and extending between the top profiles 24 of the first and second carriers 12 and 14 in such a manner as to provide a continuous surface with the aircraft skin. Said transparent skin or cover may be manufactures from such materials as MONOKOTE.

Figure 3:
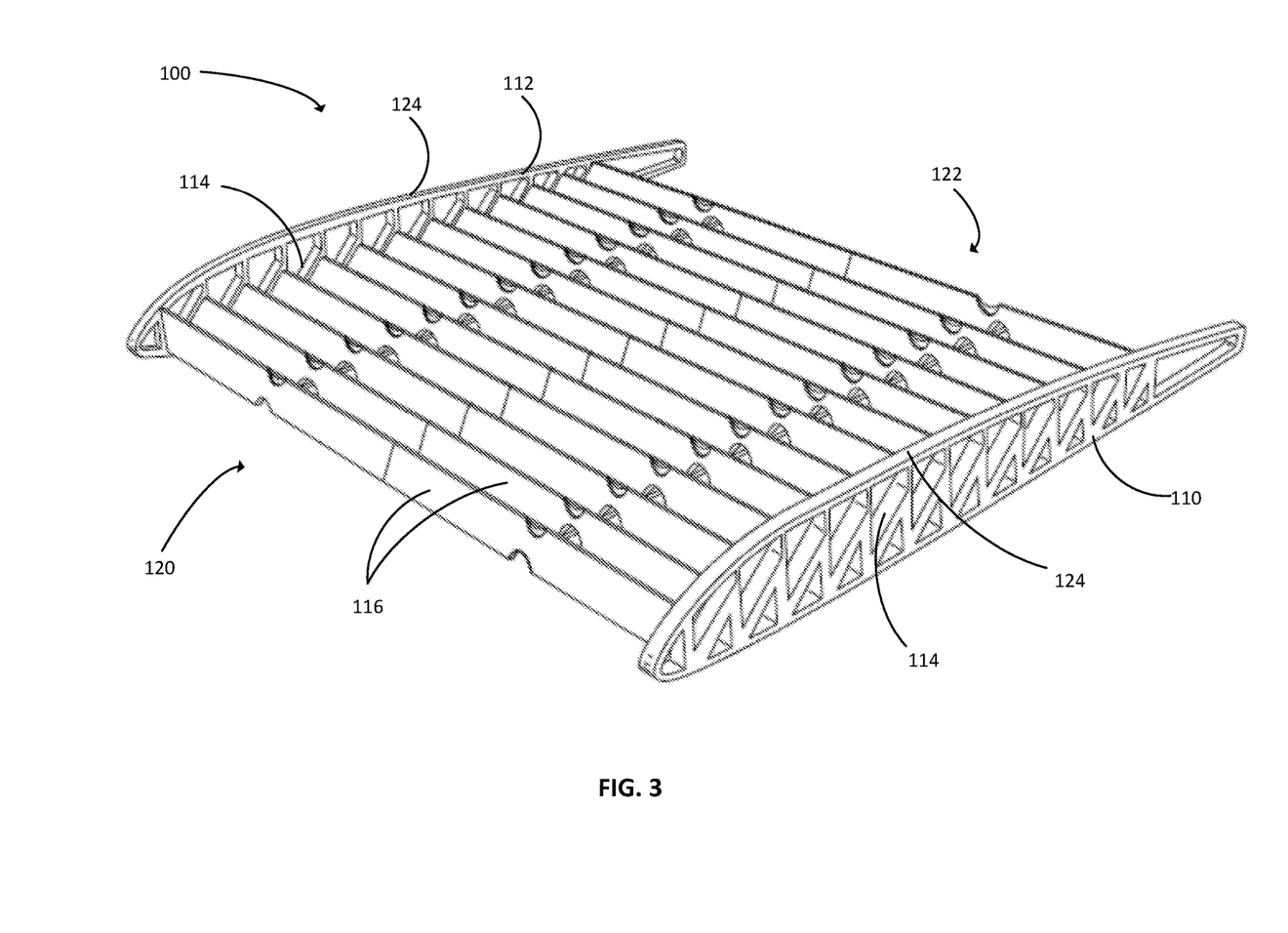
FIG. 3 is a perspective view of an alternate embodiment of a solar assembly, in accordance with the present disclosure.
Figure 4:
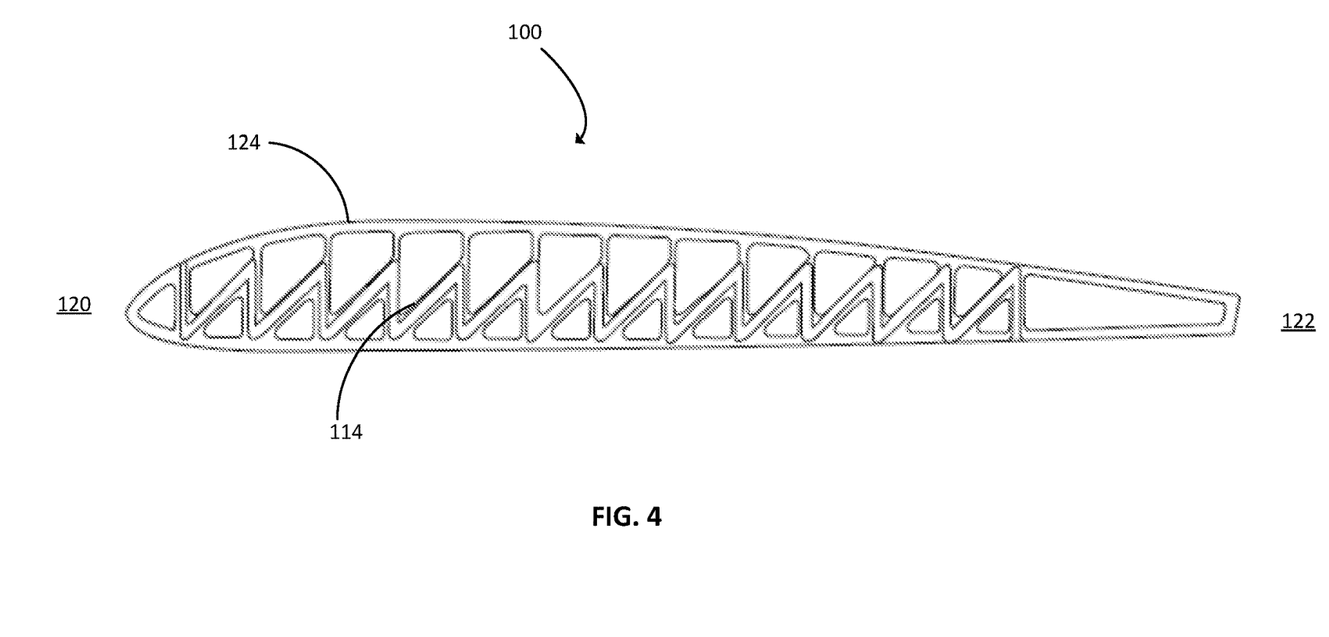
FIG. 4 is a side plan view of the alternate embodiment of the solar assembly shown in FIG. 3, in accordance with aspects of the present disclosure.

Turning now to FIGS. 3-4, shown therein and designated by reference numeral 100 are different views of an alternate embodiment of a solar assembly constructed in accordance with the present disclosure. The solar assembly 100 is similar to the solar assembly 10 discussed above except that the solar assembly 100 includes a plurality of support members. Similar to the assembly 10, the solar assembly 100 illustrated in FIGS. 3-4 includes an aerodynamic profile so as to be mounted in an aircraft wing. The solar assembly 100 comprises a first carrier 110 and a second carrier 112, the first and second carriers 110 and 112 including a plurality of slots 114 adapted or otherwise configured to receive a plurality of solar cells (not shown in FIGS. 3-4). However, the solar assembly 100 may further include a plurality of support members 116 extending between corresponding slots 114. The support members 116 extend from, or are otherwise connected to the slots 114 and may provide additional support/structure to the solar cells when mounted thereon. As discussed above with respect to the solar assembly 10, the solar assembly 100 is configured such that the solar cells may be angled or otherwise oriented with respect to each other so to provide a predetermined geometric plan, e.g., the sawtooth pattern shown in FIG. 2.

The solar assembly 100 further comprises a first end 120, a second end 122, and a top profile 124. The top profile 124 is more clearly illustrated with reference to FIG. 4 which shows a side plan view of the assembly 100. As shown in FIG. 4, the top profile 124 corresponds to the profile of the wing so as to preserve the aerodynamic profile of the wing when the solar assembly 100 is mounted therein. It is to be understood that, similar to the solar assembly 10 and top profile 24, the top profile 124 may take a variety of curves, tapers, and/or shapes so as to correspond to the profile of the structure the solar assembly 100 is to be mounted in.

The support members 116 may be constructed using a similar material as the first and second carriers 110 and 112, e.g., aircraft quality steel or aluminum, a composite material, etc., or using a different material. The support members 116 may be connected to the corresponding slots 114 and/or first and second carriers 110 and 112 using, for example, bolts, screws, adhesive, etc.

Other aspects may provide for the solar assembly 100 to be constructed as an integral or one-piece component. That is, the first and second carriers 110 and 112, the slots 114 and the support members 116 may be constructed as a single unit formed during manufacture. Exemplary methods of forming an integral solar assembly 100 may include welding, injection molding, etc.

Figure 5:
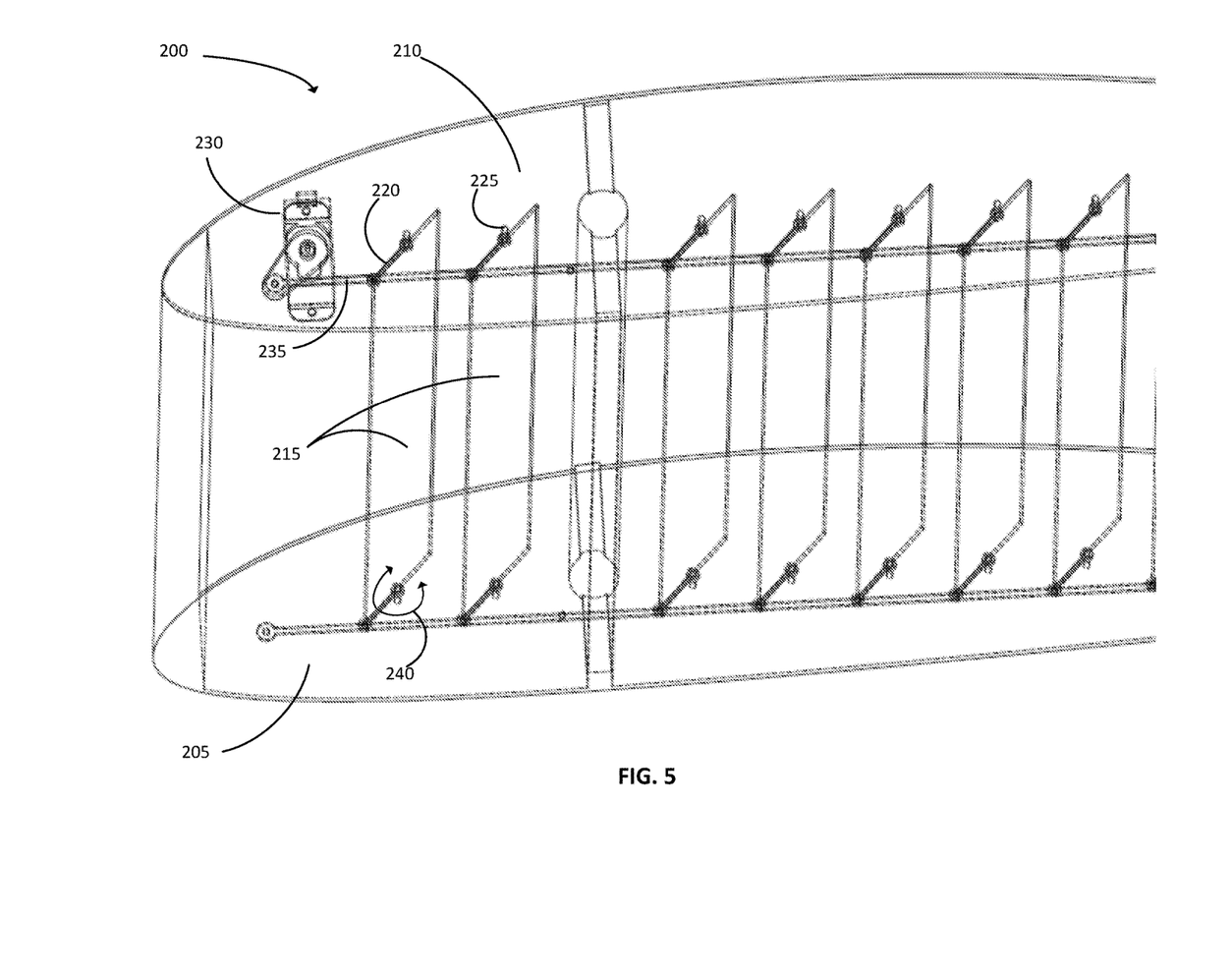
FIG. 5 is a perspective view of an adjustable solar assembly constructed in accordance with the present disclosure.

Referring now to FIG. 5, shown therein is a perspective view of at least a portion of an adjustable solar assembly 200 constructed in accordance with the present disclosure. The adjustable solar assembly 200 is configured such that the orientation of the solar cells may be adjusted, periodically or dynamically, during use in order to maximize exposure of the solar cells to an external light source. In one example, the adjustable solar assembly 200 may be included in an airplane wing having an aerodynamic profile. In this example, the orientation of the solar cells may be adjusted as the plane maneuvers so as to maintain a positive orientation with respect to the sun.

The solar assembly 200 may comprise an adjustable carrier system. The adjustable carrier system may comprise a first carrier 205, a second carrier 210 and a plurality of solar cells 215 attached to, and extending between the carriers 205 and 210. The solar cells 215 may be connected to the carriers 205 and 210 via, for example, brackets 220 that are connect to the carriers via a pivot point 225. The solar cells 215 attached to the carriers 205 and 210 via the pivot point 225 permits the solar cells 215 to rotate about an axis so as to adjust the orientation and/or angle of the solar cells 215. The adjustable carrier system may further comprise a servo motor 230 and a control arm 235 connected to the solar cells 215. The orientation of the solar cells 215 may be adjusted via the servo motor 230 connected to the solar cells 215 via the control arm 235. The control arm 235 may be connected to each of the solar cells 215 such that, as the servo motor 230 rotates, the control arm 235 rotates the solar cells 215 about the pivot point 225 so as to adjust the orientation/angle of the solar cells 215. The servo motor 230 may be connected to control circuitry (not shown) that monitors the electrical output of the solar assembly and dynamically adjusts the orientation of the solar cells 215 based on the electrical output so as to ensure optimal power point tracking with the external light source. The adjustable carrier system described herein may rotate the solar cells 215 about the pivot points 225 along an arc 240

Although the adjustable solar assembly shown in FIG. 5 is shown utilizing a servo motor 230 with gears, levers and the like, used to rotate the orientation of the solar cells 215, it is to be understood that the adjustable solar assembly 200 may alternatively utilize a linear actuator to adjust the orientation of the solar cells 215. Exemplary linear actuator systems may include, but are not limited to, a nitinol wire, piezoelectric actuation, screw-driven, and/or electromagnetic solenoid designs.

In accordance with other aspects, the solar cells 215 of the adjustable solar assembly 200 may be configured or otherwise connected to a slotted carrier system (also referred to as an adjustable carrier, a sliding carrier, a variable carrier, etc.) such that the position of the slots within the length of the carriers (i.e., between the first and second ends) can be adjusted. The slots can be expanded along the length of the carriers so as to more fully open the angles/orientation of the solar cells with respect to each other, i.e., to orient the solar cells at a first angle with respect to each other. The slots can also contract along the length of the carriers so as to close the angles/orientation of the solar cells with respect to each other, i.e., to orient the solar cells at a second angle with respect to each other. The slots utilized in an adjustable solar assembly may be connected together using a hinge, for example, so as to permit the slots to change angles with respect to each other when being expanded or contracted along the carrier length.

The slots can be expanded and/or contracted using an external force. In one example, the adjustable solar assembly may include an adjust mechanism (e.g., an adjustment screw) which permits a technician to manually adjust the angles/orientations of the solar cells during installation and/or prior to operational use (i.e., flight mission). In yet another example, the slots may be connected to an electronic motor that expands and/or contracts the slots to thereby dynamically adjust the angles/orientation of the solar cells with respect to each other. The electronic motor may be connected to control circuitry that tracks the power point tracking of the solar cells and dynamically adjusts the angles/orientation of the solar cells based on, for example, changes in the time of day, flight altitude, aircraft orientation, electrical energy being generated by the solar cells, and the like. The control circuitry may utilize a microcontroller, computerized system, analog logic, etc.

Figure 6A:
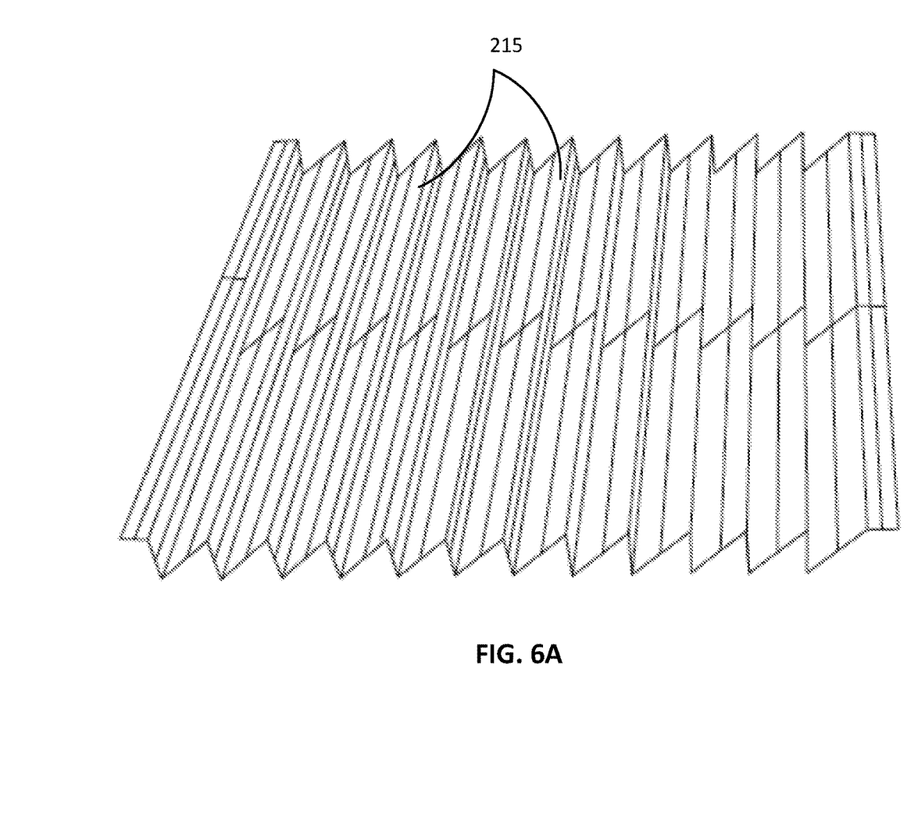
FIG. 6A is a perspective view illustrating the solar cells in an expanded position using an adjustable solar assembly, constructed in accordance with the present disclosure.
Figure 6B:
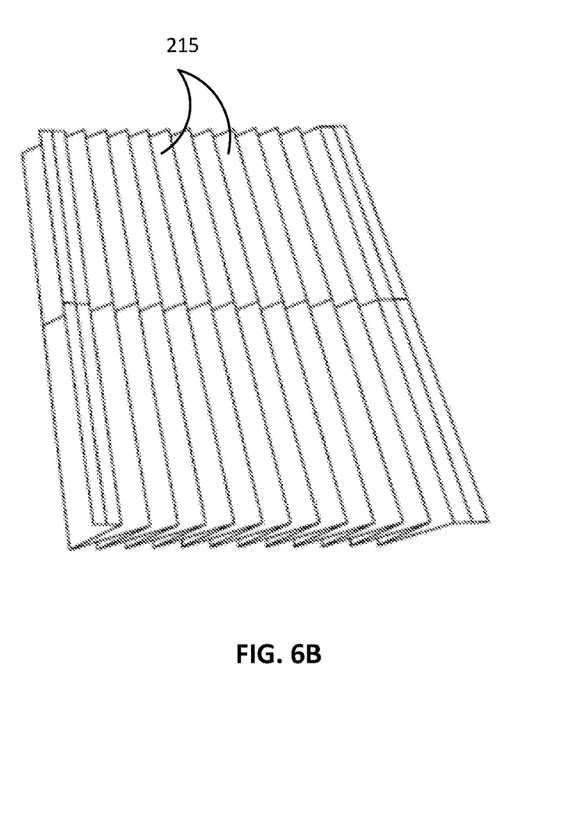
FIG. 6B is a perspective view illustrating the solar cells in a contracted position using the adjustable solar assembly constructed in accordance with the present disclosure.
Figure 7A:
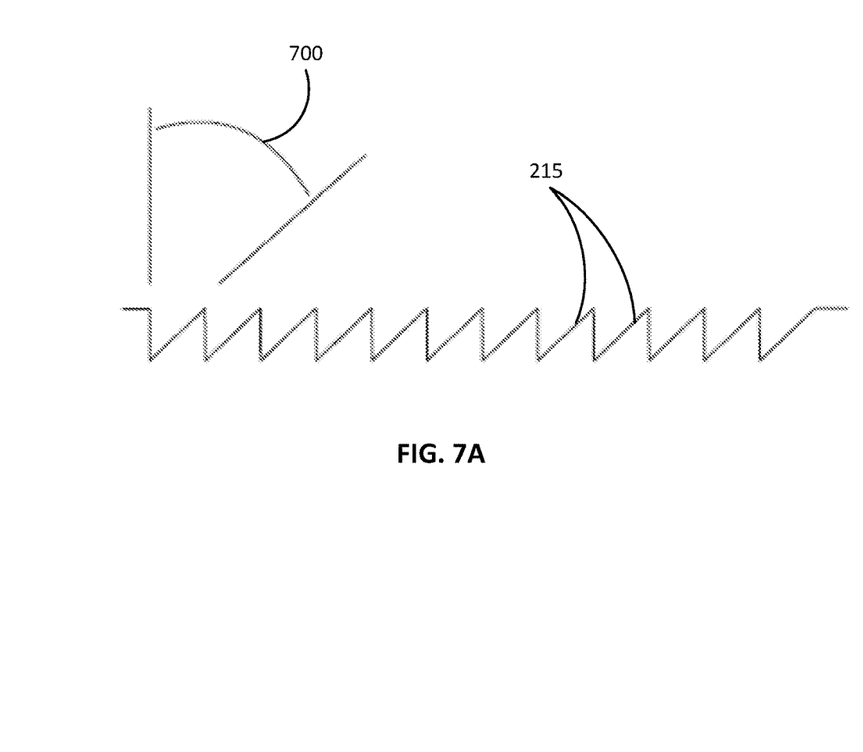
FIG. 7A is a side plan view of the solar cells in the expanded position using the adjustable solar assembly constructed in accordance with the present disclosure.

Referring to FIGS. 6 and 7 now, shown therein are one example of the differences between expanded and contracted (or collapsed) solar cells using the adjustable solar assembly having the slotted carrier system. In particular, FIG. 6A shows a perspective view of the solar cells (e.g., solar cells 215) in an expanded position wherein FIG. 6B shows the solar cells 215 in a contracted or collapsed position. FIG. 7A shows a side plan view of the solar cells 215 in the expanded position. As illustrated in FIG. 7A, the solar cells are at a first angle 700 when in the expanded position. The first angle 700 may be any angle between 0 and 180 degrees, depending on such things as the application of the solar assembly as well as the desired geometric plan for the solar cells. In one embodiment, the first angle 700 may be between 25 and 155 degrees, between 45 and 135 degrees, and 90 degrees. In the example shown in FIG. 7A, the first angle 700 is approximately 45 degrees so as to form a sawtooth geometric plan.

Figure 7B:
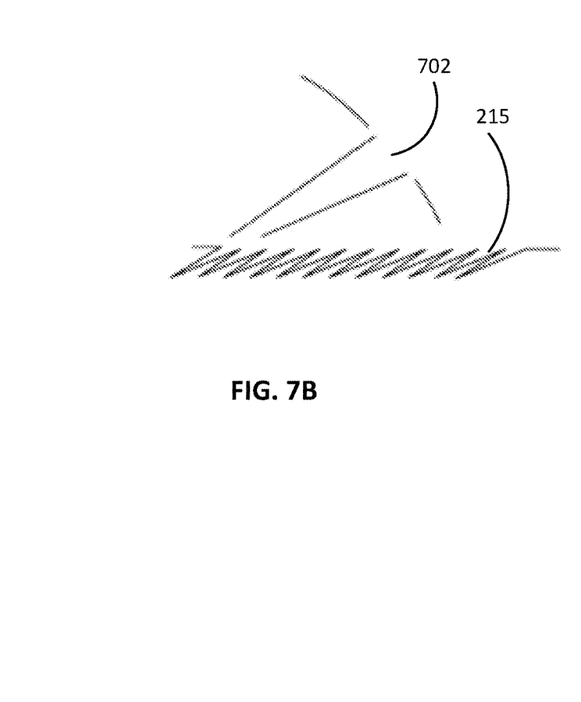
FIG. 7B is a side plan view of the solar cells in the contracted position using the adjustable solar assembly constructed in accordance with the present disclosure.

FIG. 7B shows a side plan view of the solar cells 215 in the contracted or collapsed position. As illustrated in FIG. 7B, the solar cells are at a second angle 702 when in the contracted position. The second angle 702 may be between approximately 0 to 10 degrees. One example of a structure utilizing the adjustable solar assembly to contract the solar cells is a morphing wing design. For example, a morphing wing design may extend the adjustable solar assembly when in flight to expose the solar assembly 200 to sunlight and then the contract the adjustable solar assembly 200 so as to permit the aircraft to land. One or more of the adjustable solar assemblies 200 may be included in such a morphing wing design.

In the adjustable solar assembly, the slot/carrier interface system utilized to permit the slots to be adjusted along the length of the carrier can take a variety of forms. In one example, the carriers may include a u-channel on the top and bottom inside positions wherein the slots may include a wheel riding within the u-channel. In another example, the carriers may include a t-channel on the top and bottom inside positions wherein the slots may include a t-bolt sliding within the t-channel. It is to be understood that other mechanisms/system can be utilized to permit the slots to slide within the carriers to thereby adjust the orientation/ angles of the solar cells with respect to each other. Further, the adjustable solar assembly (e.g., the slotted carrier system) may be constructed and/or integrated using any of the herein provided descriptions of the solar assemblies 10 and/or 100.

Figure 8:
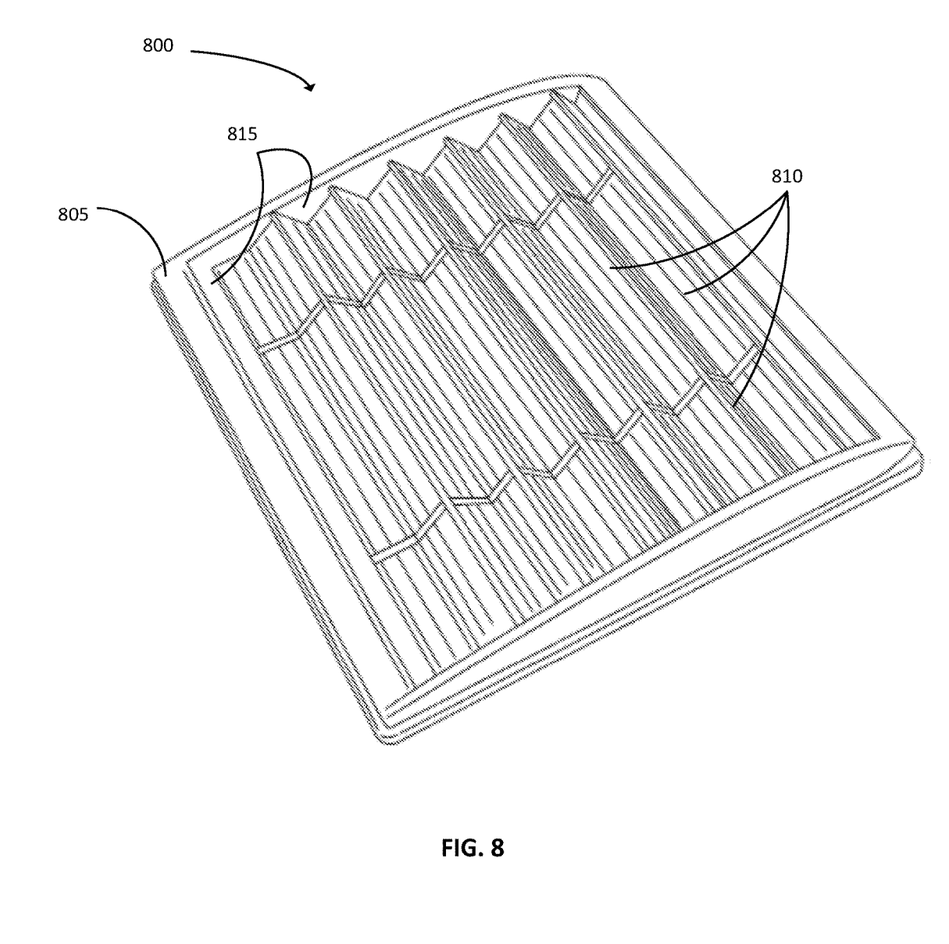
FIG. 8 is a perspective view of a solar assembly including a cover, in accordance with the present disclosure.

Referring now to FIG. 8, shown therein is an exemplary solar assembly 800 constructed in accordance with the present disclosure. The solar assembly 800 is a finished or completed solar assembly that can be constructed similar to any of the herein described solar assemblies, i.e., solar assemblies 10, 100, and/or the adjustable solar assembly 200. The solar assembly 800 comprises a cover 805 positioned over the carrier assembly (not shown), and a plurality of solar cells 810 positioned at a predetermined orientation with respect to each other. The solar assembly 800 shows the solar cells 810 oriented or arranged in a zigzag pattern. The solar assembly 800 further comprises a transparent cover positioned above and extending between the carriers that permits light to enter the solar assembly 800. The solar assembly 800 further includes an inside surface area 815 that may be covered with a reflective coating. The coating may provide additional capturing and directing of external light to the solar cells 810. The solar assembly 800 further illustrates the profile of the solar assembly constructed in accordance with the present disclosure. More particularly, the solar assembly 800 is configured to be utilized in an airplane wing structure such that the aerodynamic properties of the airplane wing are preserved.

Figure 9:
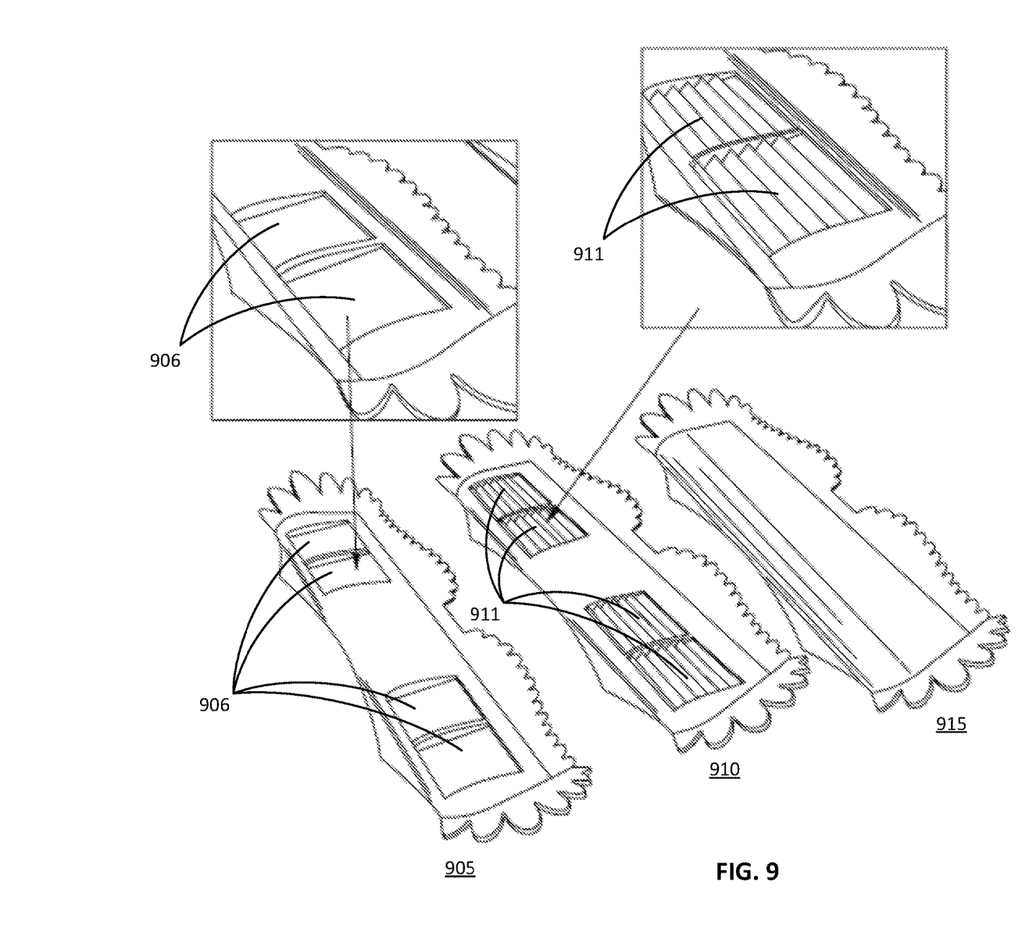
FIG. 9 is a perspective view illustrating the process steps of installing a solar assembly in a structure, in accordance with the present disclosure.

Referring now to FIG. 9, illustrated therein are the process steps 900 of incorporating a solar assembly into a structure wherein the structural profile is preserved. In the example shown in FIG. 9, the solar assembly is configured to be used in an aerodynamic wing having biomimetic properties. The solar assembly being installed in FIG. 9 can be any of the herein described solar assemblies. Generally, the process 900 comprises installing the solar assembly having a plurality of solar cells therein into a structure having an aerodynamic profile wherein, when installed, the aerodynamic profile is maintained.

The process steps 900 may include a step 905 of providing an opening 906 in a structure (e.g., an aerodynamic structure), the opening 906 configured to receive the solar assembly. The location or opening 906 in the aerodynamic structure may be between the spar and/or the ribs of the structure. A plurality of openings 906 may be provided in the structure (four being shown in FIG. 9 by way of example).

The process steps 900 may further include a step 910 of installing the solar assembly 911 in the structure. The installation of the solar assembly 11 may be accomplished using any of the herein described techniques, e.g., welding, bolts, adhesives, and the like. The solar assembly 911 being installed may be any of the herein described solar assemblies, i.e., solar assemblies 10 and/or 100, or the adjustable solar assemblies 200.

The process steps 900 may further include a step 915 of placing a transparent skin over a top aperture of the solar assembly 911. As can be seen in FIG. 9, the solar assembly and/or transparent skin may blend or otherwise conform to the profile of the aerodynamic structure. As such, the aerodynamic profile of the structure may be preserved or otherwise maintained.

It is to be understood that more than one solar assembly may be incorporated into a structure. In the illustration provided in FIG. 9, four solar assemblies are included or otherwise mounted in the biomimetic wing structure having an aerodynamic profile. However, any number of solar assemblies may be included in a structure so as to provide additional solar energy to the structure and yet maintain the integrity and structural profile of the structure.

The embodiments discussed herein are illustrative of the presently disclosed inventive concepts. As these embodiments are described with reference to illustrations, various modifications or adaptations of the methods and/or specific structures described may become apparent to those skilled in the art. All such modifications, adaptations, or variations that rely upon the teachings of the present disclosure, and through which these teachings have advanced the art, are considered to be within the spirit and scope of the present disclosure. Hence, these descriptions and drawings should not be considered in a limiting sense, as it is understood that the present disclosure is in no way limited to only the embodiments illustrated.

What is claimed is:

1. An adjustable solar assembly comprising:
a solar assembly integrated into a wing structure having an aerodynamic profile wherein, when the solar assembly is installed, the aerodynamic profile of the wing structure is maintained, the solar assembly comprising;
an adjustable carrier system comprising a plurality of solar cells attached to a plurality of slots extending between a first carrier and a second carrier of the adjustable carrier system, the adjustable carrier system comprising a sliding carrier that adjusts the position of the plurality of slots along a length of the first carrier and the second carrier, wherein adjusting the position of the plurality of slots comprises expanding a distance between the solar cells to orient the solar cells at a first angle and contracting the distance between the solar cells to orient the solar cells at a second angle.

2. The adjustable solar assembly of claim 1, wherein the wing structure comprises a morphing aerodynamic wing, and further wherein the adjustable carrier system is configured to expand the distance between the solar cells during flight and to contract the distance between the solar cells during landing.

3. The adjustable solar assembly of claim 1, wherein the adjustable carrier system further comprises a servo motor and a plurality of gears connected to each of the plurality of slots and configured to adjust the orientation of the solar cells to the first or second angles.

4. The adjustable solar assembly of claim 1, wherein the adjustable solar assembly further comprises an inside surface area comprising a reflective coating covering the inside surface area to capture and direct incident light to the plurality of solar cells.

5. The adjustable solar assembly of claim 1, wherein the wing structure comprises an unmanned aerial vehicle wing.

6. An adjustable solar assembly comprising:
a solar assembly integrated into a wing structure having an aerodynamic profile wherein, when installed, the solar assembly conforms to the aerodynamic profile of the wing structure such that the aerodynamic profile of the wing structure is maintained, the solar assembly comprising;
an adjustable carrier system comprising a plurality of solar cells extending between and connected to a first carrier and a second carrier, the adjustable carrier system configured to expand and to contract each solar cell along a length of the first and second carriers to dynamically adjust the orientation of the solar cells; and
a control circuitry monitoring an electrical output of the solar assembly to maintain an optimal power point tracking angle by dynamically adjusting the orientation of the solar cells with respect to an external light source.

7. The adjustable solar assembly of claim 6, wherein the adjustable carrier system further comprises a linear actuator mechanism configured to dynamically adjust the orientation of the plurality of solar cells.

8. The adjustable solar assembly of claim 7, wherein the linear actuator mechanism comprises a nitinol wire.

9. The adjustable solar assembly of claim 6, wherein the adjustable carrier system comprises a servo motor assembly connected to the adjustable carrier system and configured to dynamically adjust the orientation of the plurality of solar cells.

10. The adjustable solar assembly of claim 6, wherein the assembly comprises an unmanned aerial vehicle.

11. The adjustable solar assembly of claim 6, further comprising a transparent cover positioned on a top profile of the solar assembly and extending between the first carrier and the second carrier to permit incident light to enter the solar assembly, wherein the transparent cover is further configured to conform to the aerodynamic profile of the wing structure.

\* \* \* \* \*